United States Patent
Major et al.

(10) Patent No.: US 7,099,159 B2
(45) Date of Patent: Aug. 29, 2006

(54) MOTOR CONTROL HOUSING

(75) Inventors: Michael W. Major, Godfrey, IL (US); Stephen J. Burton, Fenton, MO (US)

(73) Assignee: Emerson Electric Co., St. Louis, MO (US)

( * ) Notice: Subject to any disclaimer, the term of this patent is extended or adjusted under 35 U.S.C. 154(b) by 265 days.

(21) Appl. No.: 10/310,568

(22) Filed: Dec. 5, 2002

(65) Prior Publication Data

US 2004/0109295 A1 Jun. 10, 2004

(51) Int. Cl.
*H05K 7/14* (2006.01)
*H05K 7/18* (2006.01)

(52) U.S. Cl. ............ 361/801; 361/752; 361/797; 361/800

(58) Field of Classification Search ............ 361/801, 361/752, 797, 800, 759, 740, 732, 726, 747, 361/802
See application file for complete search history.

(56) References Cited

U.S. PATENT DOCUMENTS

| | | | | |
|---|---|---|---|---|
| 4,898,009 A | * | 2/1990 | Lakoski et al. | 70/58 |
| 5,544,006 A | * | 8/1996 | Radloff et al. | 361/683 |
| 5,673,174 A | * | 9/1997 | Hamirani | 361/686 |
| 5,928,546 A | * | 7/1999 | Kramer et al. | 219/497 |
| 6,778,408 B1 | * | 8/2004 | Yang | 361/796 |

* cited by examiner

*Primary Examiner*—Kamand Cuneo
*Assistant Examiner*—Hung S. Bui
(74) *Attorney, Agent, or Firm*—Thompson Coburn, LLP

(57) ABSTRACT

An appliance circuitry housing is designed so a circuit board can be attached directly to the housing interior with circuit board electric terminals being accessible from the housing exterior. An integral door on the housing exterior can be pivoted to a closed position over the electric terminals and connected plugs. A plurality of housing legs with slots engage in openings in the appliance to secure the housing to the appliance. A resilient latch on the housing exterior holds the housing in its attached position to the appliance.

17 Claims, 14 Drawing Sheets

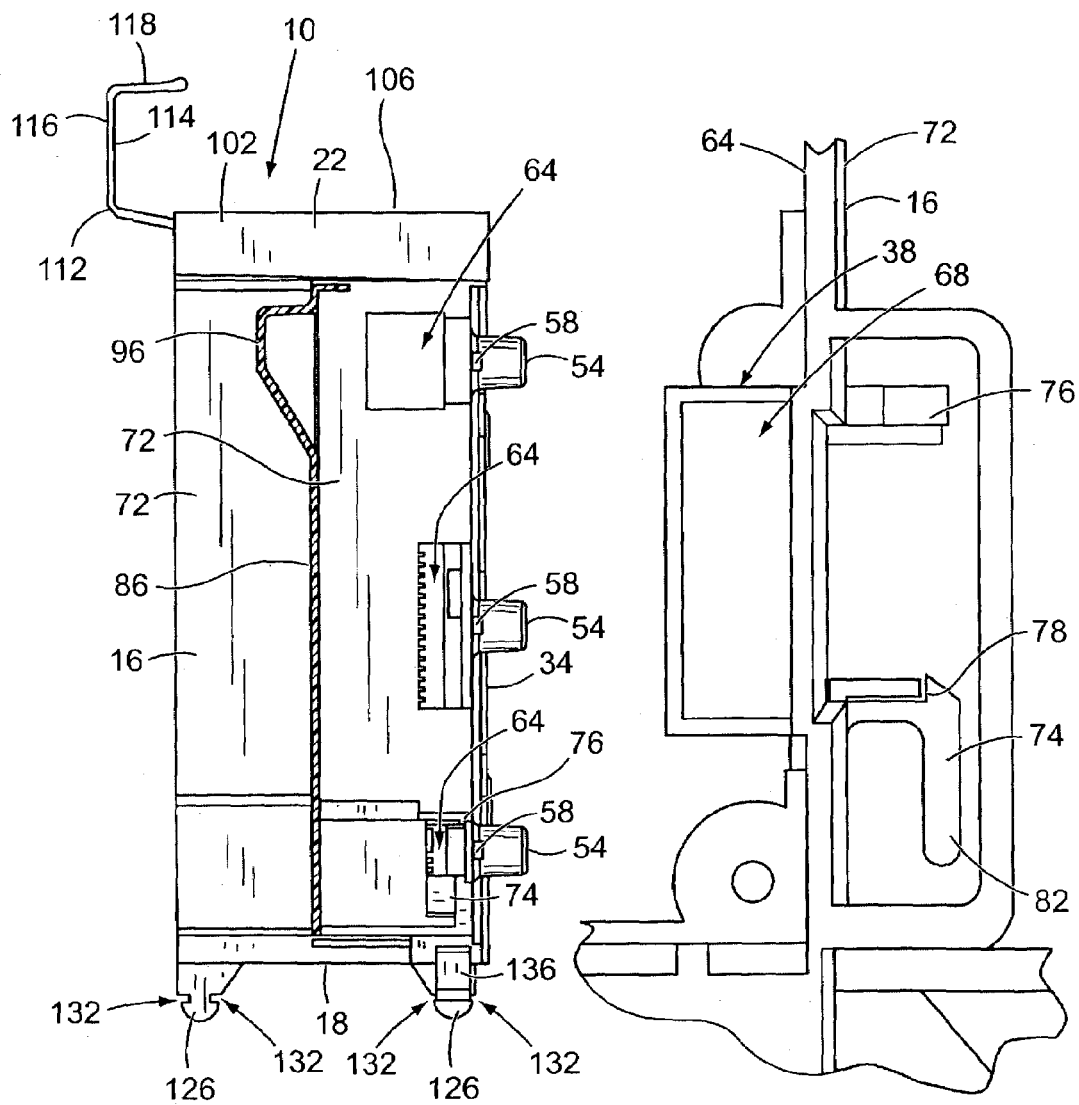
Fig. 4
Fig. 9
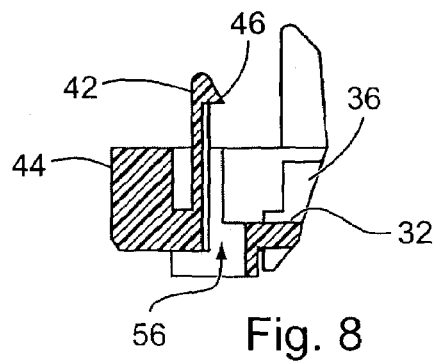
Fig. 8

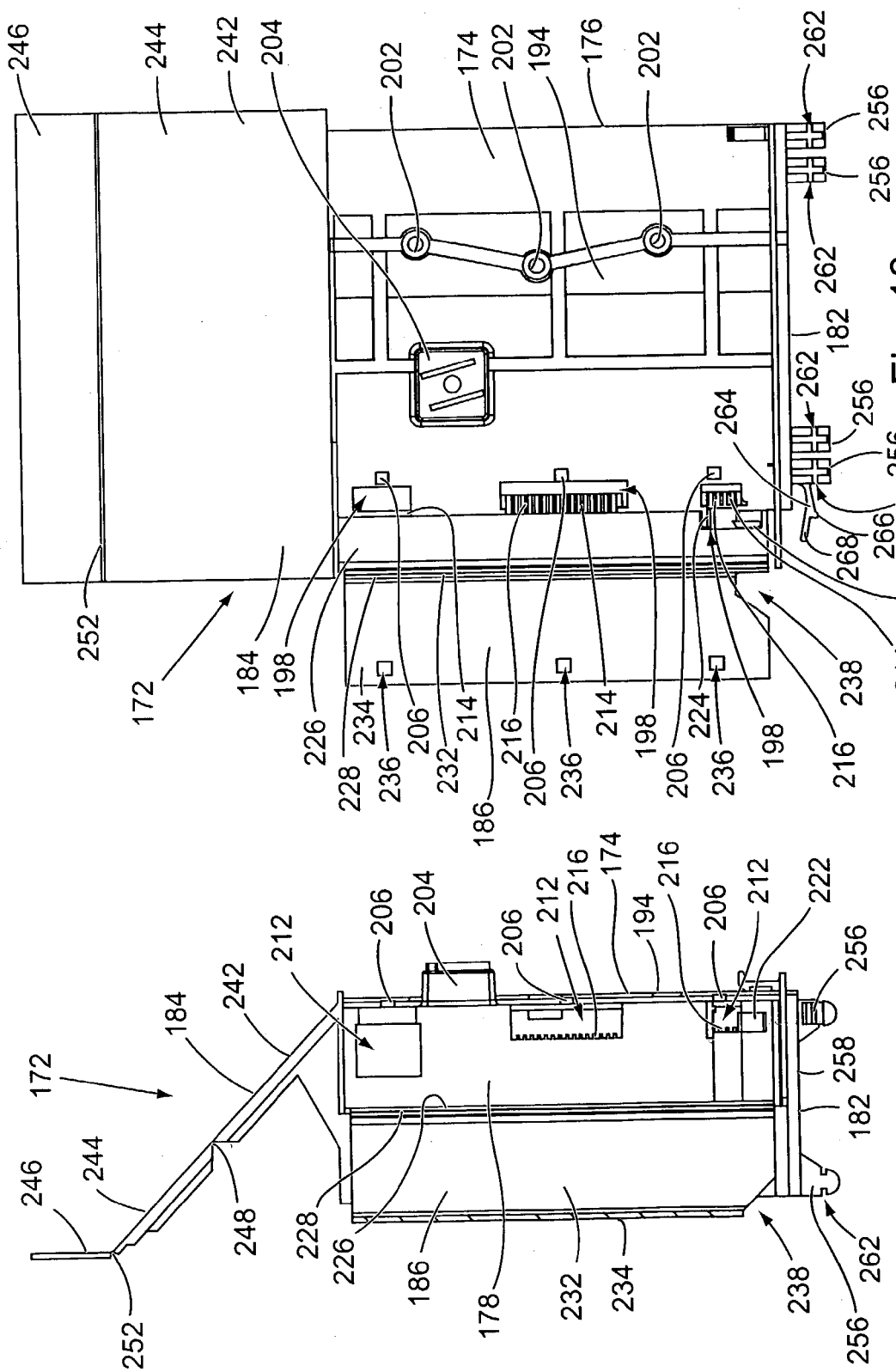

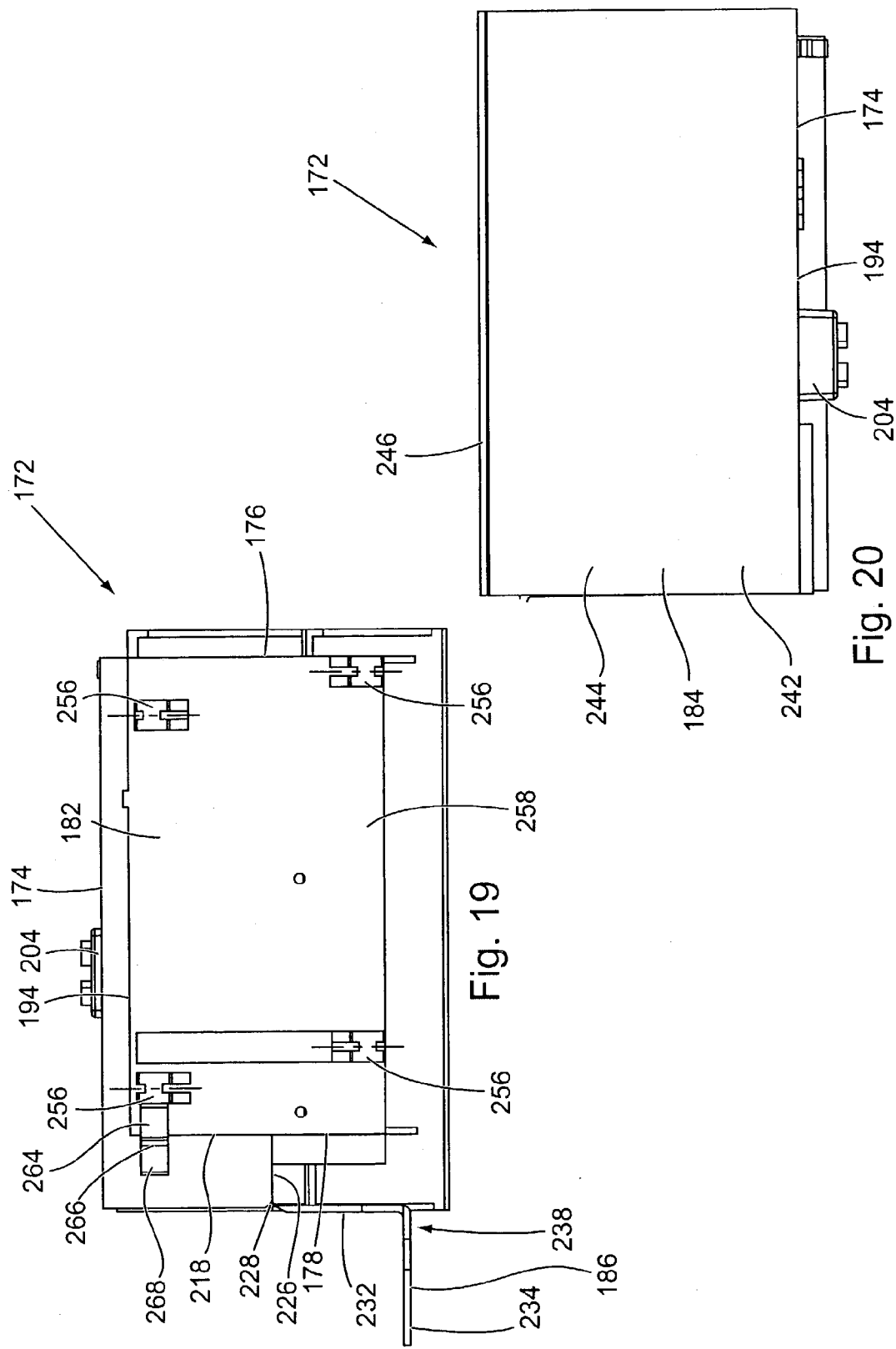

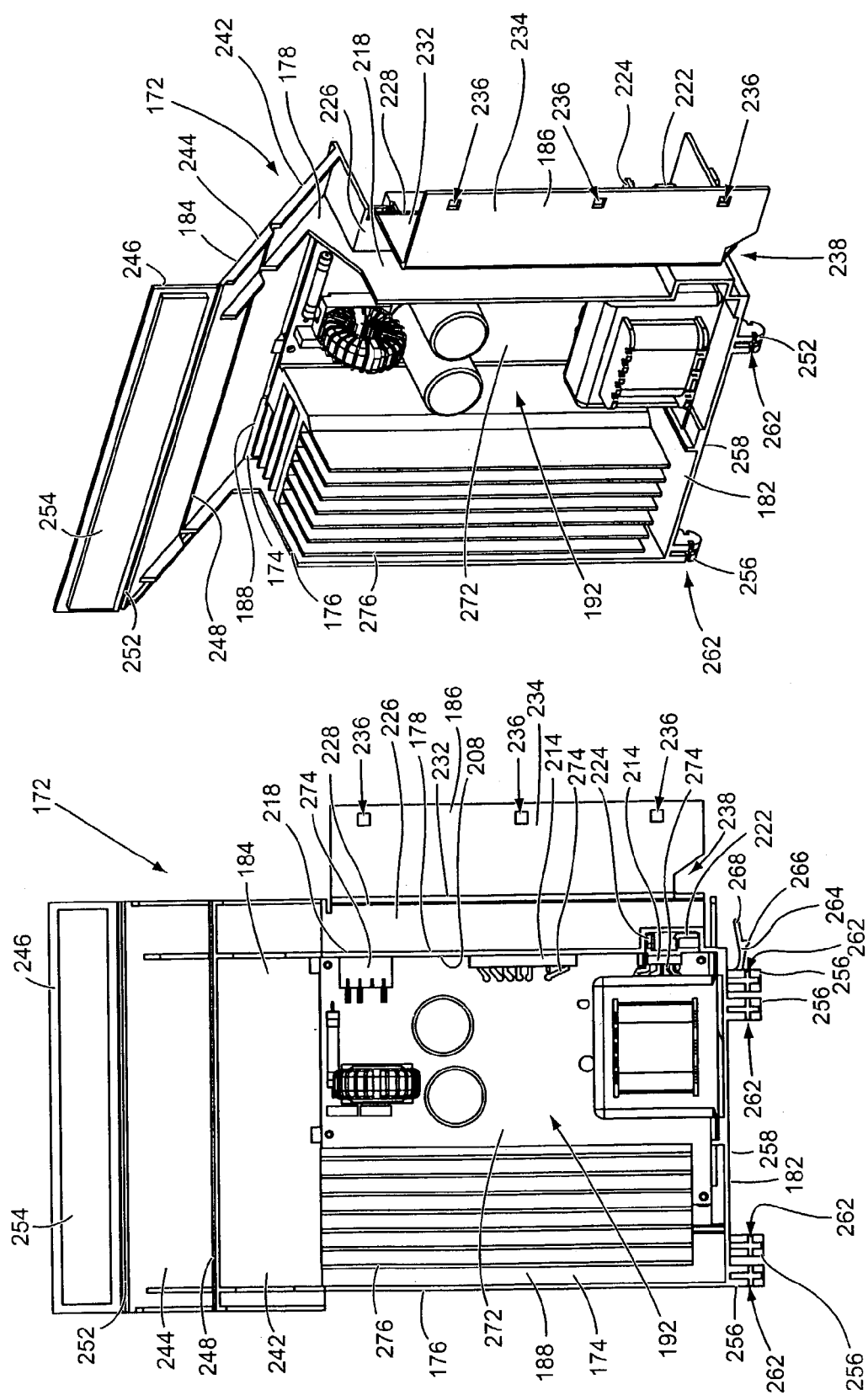

MOTOR CONTROL HOUSING

BACKGROUND OF THE INVENTION

1. Field of the Invention

The present invention pertains to a housing that encloses the electronic control circuitry of an appliance. In particular, the present invention pertains to a housing that protects the motor control circuitry of a household appliance from moisture, dust and dirt where the housing has been specifically designed to facilitate assembly of the motor control circuit board into the housing so that electric terminals of the circuit board are accessible from the exterior of the housing. In addition, the housing is specifically designed to be easily attached into the interior of the appliance and removed if necessary. When attached to the interior of the appliance, the electric terminals of the circuit board are easily accessible from the exterior of the housing for attachment of the appliance wiring plugs to the circuit board electric terminals with the housing being specifically designed to facilitate the attachment of the appliance wiring plugs.

2. Related Art

Home appliances typically have their control circuitry enclosed in a protective housing that isolates the circuitry from moisture, dust and dirt. The control circuitry of the appliance is typically assembled into the housing by the appliance manufacturer. The housing with the installed circuitry is then assembled into the appliance. The wiring of the appliance is then connected to the control circuitry, typically by extending the wiring of the appliance into the interior of the circuitry housing and connecting plugs at the ends of the appliance wiring to electric terminals on a circuit board mounted in the housing. A separate cover is then attached to the housing to protect the electric terminals and the connected plugs from moisture, dust and dirt.

The prior art appliance control circuitry housings have been found to be disadvantaged in that they typically require the control circuit board of the appliance to be mounted on a separate frame before attaching the circuit board to the interior of the housing. The circuit board is typically attached to the frame which in turn is attached to the interior of the housing in securing the control circuit board to the housing. This requires that the housing actually be a two-part structure, the housing itself and the frame for the circuit board. In addition, the separate cover of the housing that covers over the circuit board electric terminals and the appliance wiring plugs connected to those terminals is a third part of the housing. Thus, the three pieces required of prior art control circuit housings increased their manufacturing cost.

In addition, the prior art control circuitry housing is usually attached to the interior of the appliance prior to the appliance wiring plugs being attached to the electric terminals on the control circuit board. With the housing attached to the appliance interior, it is often difficult to access the electric terminals on the circuit board in attaching the appliance wiring plugs to the terminals, making assembly of the appliance difficult.

Furthermore, because a secure attachment of the control circuitry housing to the interior of the appliance is necessary for the housing to remain secured to the appliance when the appliance is shipped, it is often difficult to remove the control circuitry housing from the interior of the appliance when servicing of the circuitry is needed.

What is needed to overcome the disadvantages of prior art appliance control circuitry housings described above is a control circuitry housing that can have the control circuit board assembled to the housing without requiring additional housing parts such as a frame and separate cover, a housing that provides easy access to the electric terminals of the circuitry once the circuit board is attached to the housing to facilitate the attachment of the appliance wiring plugs to the electric terminals, that provides adequate ventilation of the circuit board heat sink to avoid any heat-related failures of the appliance circuitry, that provides protection to the circuit board electric terminals and the attached appliance wiring plugs from moisture, dirt and dust without requiring additional parts of the housing, and a housing that is easily attached and removed from the interior of the appliance when servicing is needed.

SUMMARY OF THE INVENTION

The appliance circuitry housing of the present invention is constructed of an electrically insulating material, preferably a plastic material. The housing is constructed with a base or bottom wall, a back wall, a top wall and one side wall that surround an interior volume of the housing that is accessible through a large opening opposite the back wall. The interior surface of the housing back wall is provided with a plurality of clasps at one side of the back wall and a plurality of resilient tabs at the opposite side of the back wall that receive the circuit board of the appliance directly without the need for a separate frame. The circuit board is snapped between the clasps and resilient tabs and is held to the back wall without separate fasteners. Fastener holes are provided through the back wall for a more secure attachment of the circuit board to the housing.

With the circuit board attached to the interior of the housing, the electric terminals of the circuit board are positioned in terminal openings that pass through the housing back wall and side wall where the two walls come together. With this positioning of the electric terminals, they are easily accessible from the exterior of the housing even after the housing is installed in the appliance. Posts are provided on the exterior of the housing back wall in positions adjacent each electric terminal opening so that a person installing appliance wiring plugs on the electric terminals can engage a post with a forefinger of one hand and press the wiring plug onto the electric terminal with the thumb of the same hand, facilitating the attachment of the wiring plugs to the electric terminals.

A door covering is formed as an integral part of the housing and is connected to the exterior surface of the housing side wall by a living hinge. The door is easily pivoted to its closed position where it overlaps portions of the side wall and back wall on the exterior of the housing and covers and protects the circuitry electric terminals and the attached appliance wiring plugs. Resilient snaps are provided on the housing back wall exterior surface that hold the door in its closed position over the terminals and plugs. Levers project outwardly from the door that can be engaged with a hand of a person to provide leverage in opening the door from its closed position.

The opposite side of the housing interior from the side wall is left open. This enables a larger heat sink to be used with the circuit board of the appliance and enables the heat sink to project from the housing interior through the opening opposite the side wall to a position outside of the housing. The ability to use a larger heat sink and to position a portion of the heat sink outside of the housing interior provides better cooling ventilation for the heat sink.

The housing bottom or base has a plurality of legs that project downwardly from the exterior surface. Each of the legs has slots formed in opposite sides of the legs. The leg slots are provided to engage the legs with key shaped openings provided in the appliance to secure the housing base to the appliance. The key shaped openings have two sections, one with a large opening area to enable the entire housing leg to be inserted there through, and the other with a smaller narrow area. The housing legs are inserted into the larger area openings and then are moved sideways through the narrow openings with opposite edges of the appliance on opposite sides of the narrow openings engaging in the pairs of slots formed at the opposite sides of each of the housing legs. A resilient latch is also provided on the housing base that engages in an opening in the appliance as the housing legs are moved sideways through the narrow slots. The latch snaps into the housing in the appliance to securely hold the base of the housing to the appliance.

A flexible flap is also provided at the top of the housing that has an adhesive pad secured to one side of the flap and a projecting handle on the opposite side of the flap. The flap can be pressed against a side wall of the appliance to secure the flap to the side wall and further secure the housing to the appliance. The handle projecting from the flap is easily engaged by a person's hand when it is desired to pull the flap away from the appliance side wall when removing the housing from the appliance.

In an alternative embodiment of the control circuitry housing, an additional interior compartment is provided at the bottom of the housing interior that can accommodate a mother board where needed.

A still further embodiment of the housing has a completely enclosed interior volume that is accessible only through the front of the housing. The circuit board is attached directly to the housing in the housing interior by threaded fasteners. Like the first described embodiment, with the circuit board attached to the interior of the housing, the electric terminals of the circuit board are positioned in terminal openings that pass through the back wall and side wall of the housing.

A door is formed as an integral part of the housing as in the first embodiment. The door pivots to its closed position overlapping portions of the side wall and back wall and protecting the circuitry terminals of the circuit board and the attached wiring plugs of the appliance. Resilient snaps are provided on the housing back wall for holding the door in its closed position.

The housing bottom or base also has a plurality of legs that are formed with slots in opposite sides of the legs as in the first embodiment. The leg slots engage with the key-shaped openings in the appliance in securing the housing base to the appliance. The housing base is also provided with a resilient latch that engages in an opening in the appliance to securely hold the housing base to the appliance.

The top of the housing is formed with a flexible flap secured to the housing by a living hinge at one end of the flap. An adhesive pad is secured to the opposite end of the flap and is pressed against the appliance side wall to secure the flap and the housing to the side wall.

BRIEF DESCRIPTION OF THE DRAWINGS

Further features of the present invention are set forth in the following detailed description of the preferred embodiment of the invention and in the drawing figures wherein:

FIG. 4 is a right side elevational view of the housing similar to FIG. 3, but with a portion of the housing door cut away along the line 4—4 of FIG. 1;

FIG. 8 is a partial cross section view of a resilient tab of the housing from along the line 8—8 in FIG. 1;

FIG. 9 is an enlarged partial view showing details of the housing circled in FIG. 1;

FIG. 17 is a cross section of the right side elevation view of the housing along the line 17—17 of FIG. 14;

FIG. 18 is an elevation view of the rear of the housing of FIG. 14;

FIG. 19 is a plan view of the bottom of the housing of FIG. 14;

FIG. 20 is a plan view of the top of the housing of FIG. 14;

FIG. 21 is an elevation view of the front of the housing of FIG. 14 with a circuit board installed; and FIG. 22 is a perspective view of the housing of FIG. 14 with a circuit board installed.

DETAILED DESCRIPTION OF THE PREFERRED EMBODIMENTS

As stated earlier, the appliance control circuitry housing of the invention is preferably constructed of an electrically insulating material, such as a plastic. In the illustrative environment of the housing it is disclosed as being employed in enclosing motor control circuitry for a home appliance such as a clothes washer or dryer. However, the housing may be employed in other environments.

Figure 1:
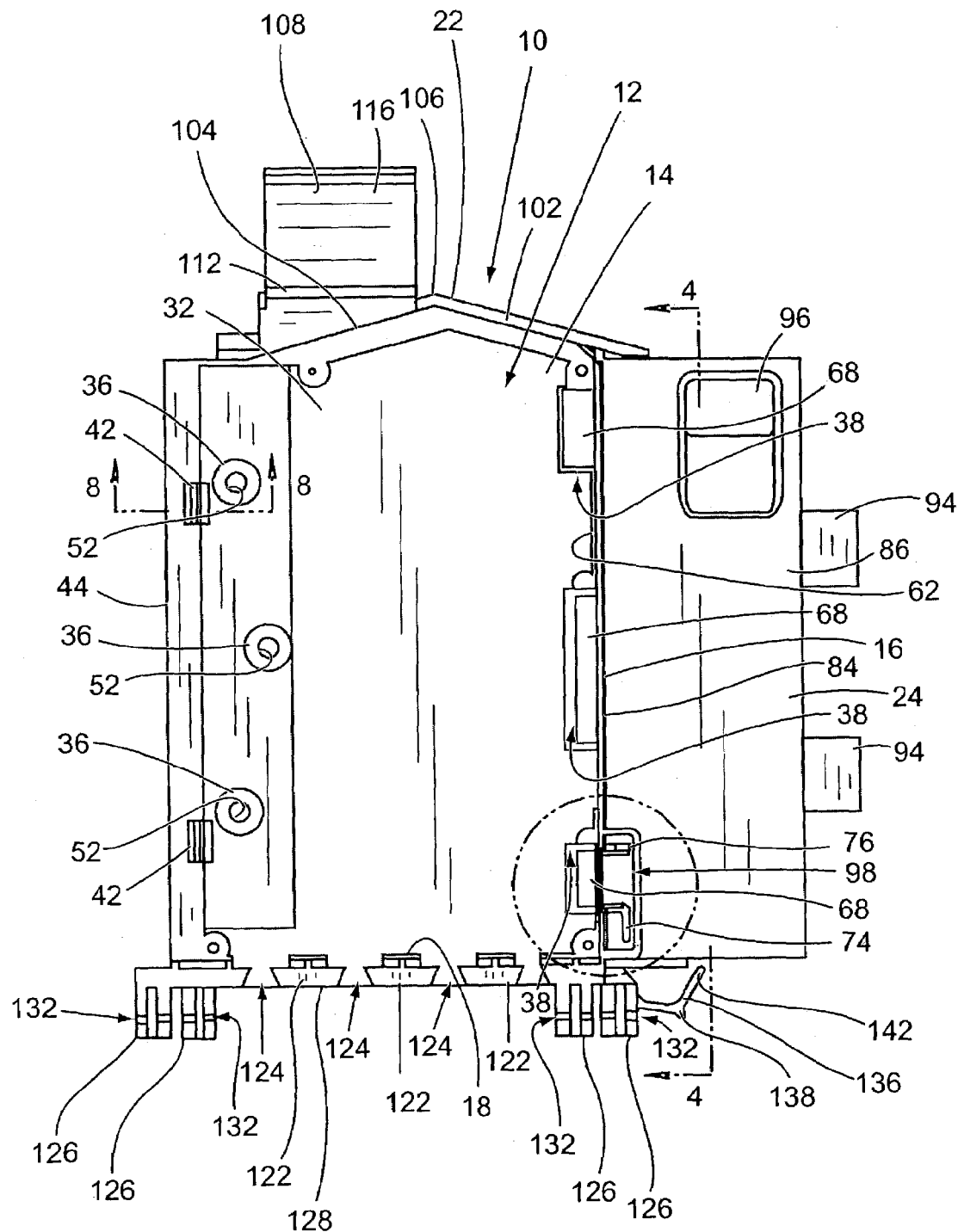
FIG. 1 is a front elevation view of the appliance control circuitry housing of the invention.

FIG. 1 shows a front view of the housing 10 which is open at the front to provide access to the housing interior volume 12. The housing is basically comprised of a back wall 14, a right side wall 16, a bottom wall 18, an opposite top wall 22 and a door 24 on an exterior surface of the side wall 16. The back wall, side wall, bottom wall, top wall and door cover are all integrally molded as a single unit. It should be noted that the housing does not include a left side wall opposite the right side wall 16. This opening at the side of the housing is left for a heat sink on a circuit board that is mounted into the housing interior to protrude through the opening to the exterior of the housing, as will be explained.

The housing back wall 14 has an interior surface 32 that opposes the housing interior volume 12, and an opposite exterior surface 34. The back wall interior surface 32 is basically flat except for the presence of three posts 36 that support the circuit board and receive threaded fasteners, as will be explained. Three generally rectangular openings 38 pass through the back wall 14 adjacent to its connection to the right side wall 16. These three generally rectangular openings 38 accommodate the electric terminals of the circuit board that is mounted to the back wall interior surface 32, as will later be explained. A pair of resilient tabs 42 project outwardly from the back wall interior surface 32 adjacent the left-hand edge 44 of the back wall as viewed in FIG. 1. FIG. 8 shows each of the resilient tabs 42 in an enlarged cross-section view showing the detail of each tab. As seen in FIG. 8, each tab 42 has a length that projects from the back wall interior surface 32 and gives the tab its resiliency. A hook 46 or pawl projects outwardly from the distal end of the tab 42 toward the opposite right side wall 16 of the housing. It can also be seen that the length of the tab positions the hook 46 outwardly from the end of the post 36 by a distance determined to accommodate the circuit board.

Figure 5:
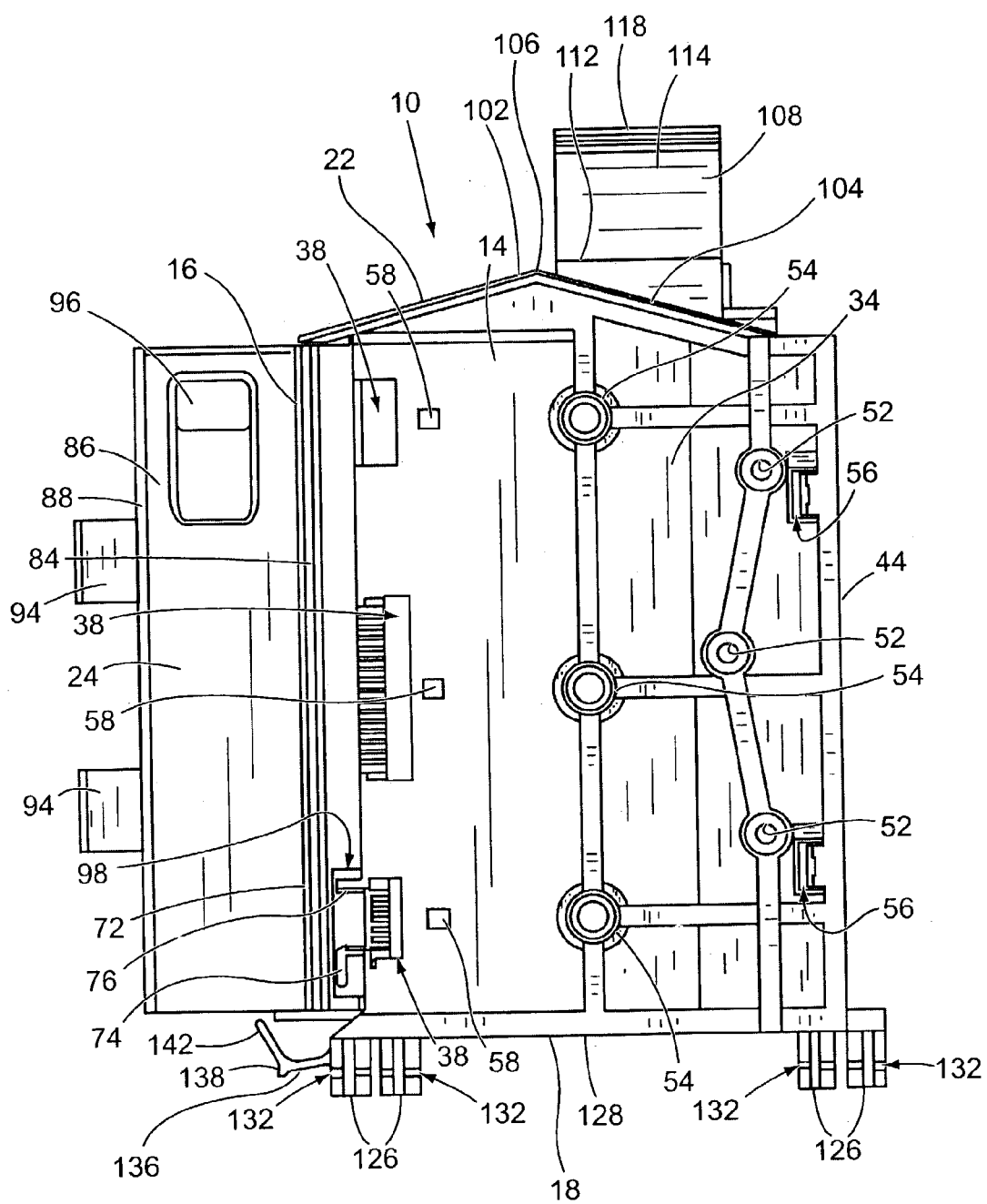
FIG. 5 is an elevational view of the rear of the housing.
Figure 7:
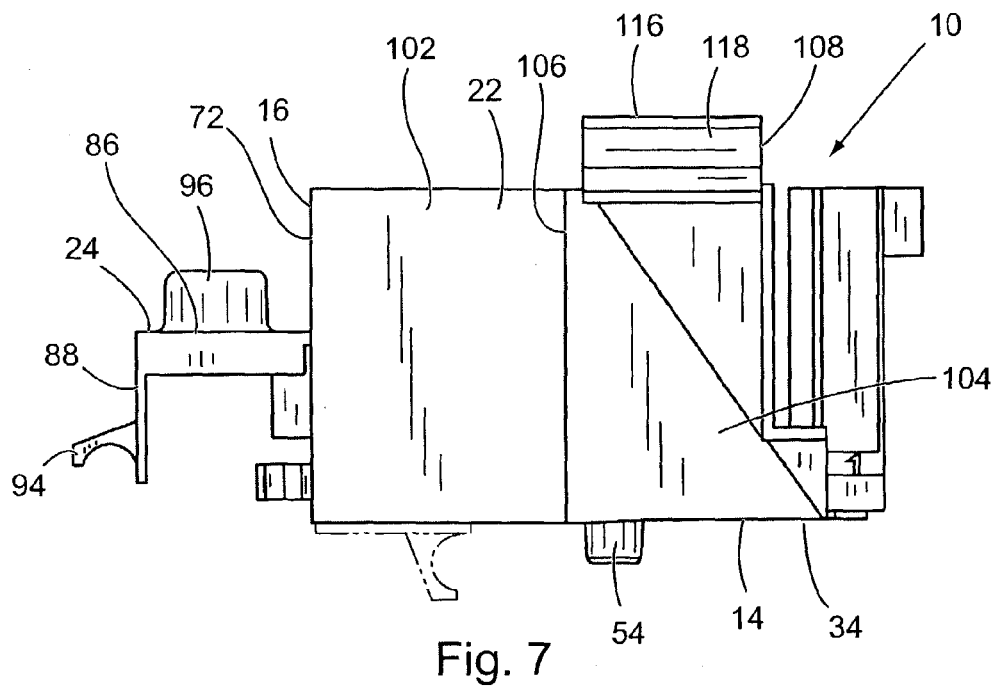
FIG. 7 is a plan view of the top of the housing.
Figure 6:
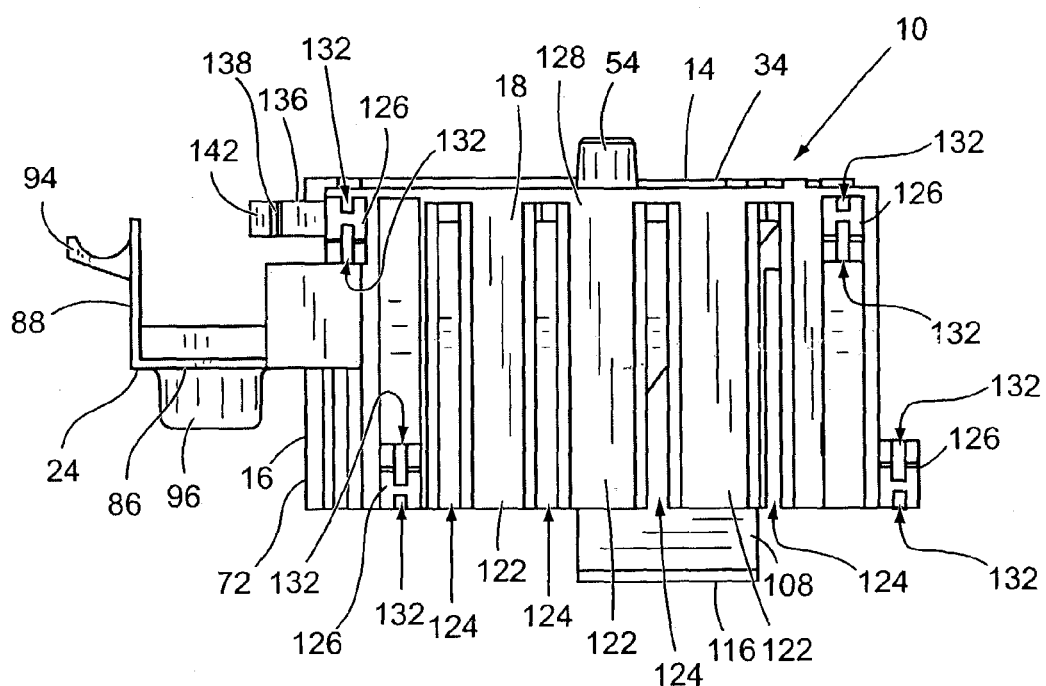
FIG. 6 is a plan view of the bottom of the housing.

The back wall exterior surface 34 is shown in FIG. 5. The exterior surface has three fastener holes 52 that extend through the back wall and are aligned with the posts 36 that project outwardly from the back wall interior surface. In addition, three posts 54 project outwardly from the back wall exterior surface 34. As seen in FIG. 5, each of the posts 54 is horizontally aligned with one of the electric terminal openings 38 that pass through the back wall. A pair of rectangular openings 56 pass through the back wall adjacent the resilient tabs 42. These rectangular openings 56 are used in manipulating the resilient tabs 42 when removing a circuit board from the housing interior. Three projections 58 that are generally triangular in cross-section project outwardly from the back wall exterior surface 34 adjacent the rectangular electric terminal openings 38. These projections are employed in holding the door 24 in a closed position which will be explained later.

Figures 2, 3:
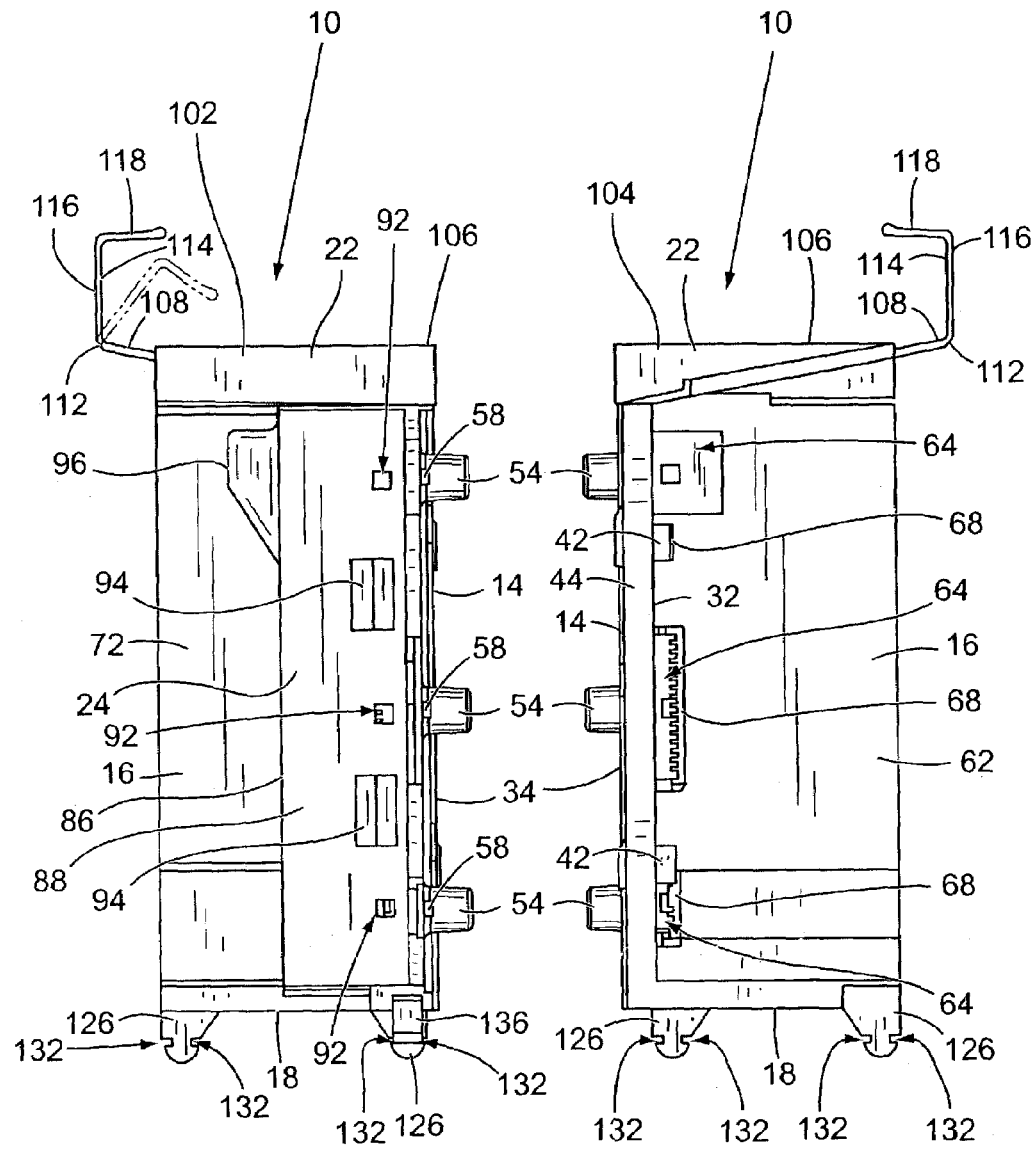
FIG. 2 is a left side elevational view of the housing.
FIG. 3 is a right side elevational view of the housing.

The right side wall 16 projects outwardly from the back wall interior surface 32 at a right angle to the surface. The right side wall has an interior surface 62 that faces toward the housing interior volume 12. The right side wall has three generally rectangular openings 64 that correspond to and are extensions of the three generally rectangular openings 38 in the back wall. In addition, a pair of clasps or flanges 68 project outwardly from the right side wall interior surface 62 in positions adjacent to but spaced outwardly from two of the rectangular openings 38 in the back wall. The flanges or clasps 68 are employed in securing the circuit board to the back wall 14. On the right side wall exterior surface 72, adjacent the bottom opening 64 in the right side wall as viewed in FIGS. 1 and 2 is a resilient latch 74 on one side of the opening and a positioning panel 76 on the opposite side of the opening. These are shown enlarged in FIG. 9. The latch 74 holds an appliance wiring plug in the bottom opening. The latch 74 projects outwardly from the side wall exterior surface 72 to a hook or pawl 78 on one side of the latch. A finger tab 82 projects from the opposite side of the latch. The finger tab 82 is pressed toward the side wall exterior surface 72 to displace the hook 78 away from the bottom opening 64 while the plug is inserted into the opening and against the positioning panel 76. With the plug inserted the finger tab 82 is released and the resiliency of the tab causes the hook 78 to move into a position over the plug to hold the plug in the opening.

The door 24 is also mounted on the right side wall exterior surface 72. The door 24 extends along the length of the right side wall exterior surface and is connected to the exterior surface by a living hinge 84 that is an integral part of the door and an integral part of the right side wall exterior surface 72. The door 24 has an L-shape with a first section 86 that overlaps the right side wall when the door is closed and a second section 88 that overlaps the back wall when the door is closed. The door has three small square openings 92 through the second section 88 that are positioned to receive the three projections 58 on the back wall exterior surface when the door is moved to the closed position. The projections 58 engaging in the holes 92 hold the door in the closed position. A pair of levers 94 project outwardly from the door second section 88 and are employed as levers in pulling the door away from its closed position disengaging the projections 58 from the door holes 92. The door has a cowling 96 formed on the exterior surface of the door. The interior of the cowling 96 receives an appliance wiring plug that has been connected to the electric terminals of the circuit board when the door is moved to its closed position. In addition, a rectangular opening 98 is provided in the door that allows the plug latch 74 and positioning panel 76 on the side wall exterior surface to pass through the opening 98 when the door is moved to its closed position.

The housing top wall 22 is comprised of two panels 102, 104 that come together at a peak 106. This peaked configuration of the top wall 22 will cause any moisture from the appliance that falls onto the top wall to drain away to the sides of the housing. An attachment flap 108 also projects outwardly from the top wall. The flap 108 has a living hinge 112 formed in the flap that transverses the width of the flap. A rectangular section of the flap 114 adjacent the hinge 112 has a surface 116 on which an adhesive pad is applied. The adhesive pad is pressed against a side wall of the appliance in attaching the housing to the appliance, as will be explained. A handle 118 projects outwardly from the flap section 114. The handle 118 is easily accessible by a person's hand to pull the adhesive flap section 114 away from the appliance wall when removing the housing from the appliance.

The bottom wall 18 of the housing is comprised of a plurality of parallel, spaced bars 122 that extend along the bottom of the housing. The spacings 124 between adjacent bars 122 provide for venting of the housing interior. Four housing legs 126 project downwardly from the bottom wall exterior surface 128. Each of the legs 126 has a pair of slots 132 formed in opposite side surfaces of the legs. As seen in the drawing figures, the pairs of slots 132 are formed in the same side surfaces of each of the legs 126. A resilient latch 136 also projects outwardly from the bottom wall exterior surface 128. The latch 136 has a resilient length that extends to a hook 138 at the distal end of the latch's length and a finger tab 142 adjacent the hook. In the at-rest position of the latch 136 shown in the drawing figures, the hook 138 is positioned in the same horizontal plane as the pairs of leg slots 132. Pressing against the finger tab 142 bends the resilient latch 136 and raises the hook 138 out of the plane of the leg slots 132. Releasing the tab 142 allows the resilience of the latch to return the hook 138 to the plane of the leg slots 132.

Figure 10:
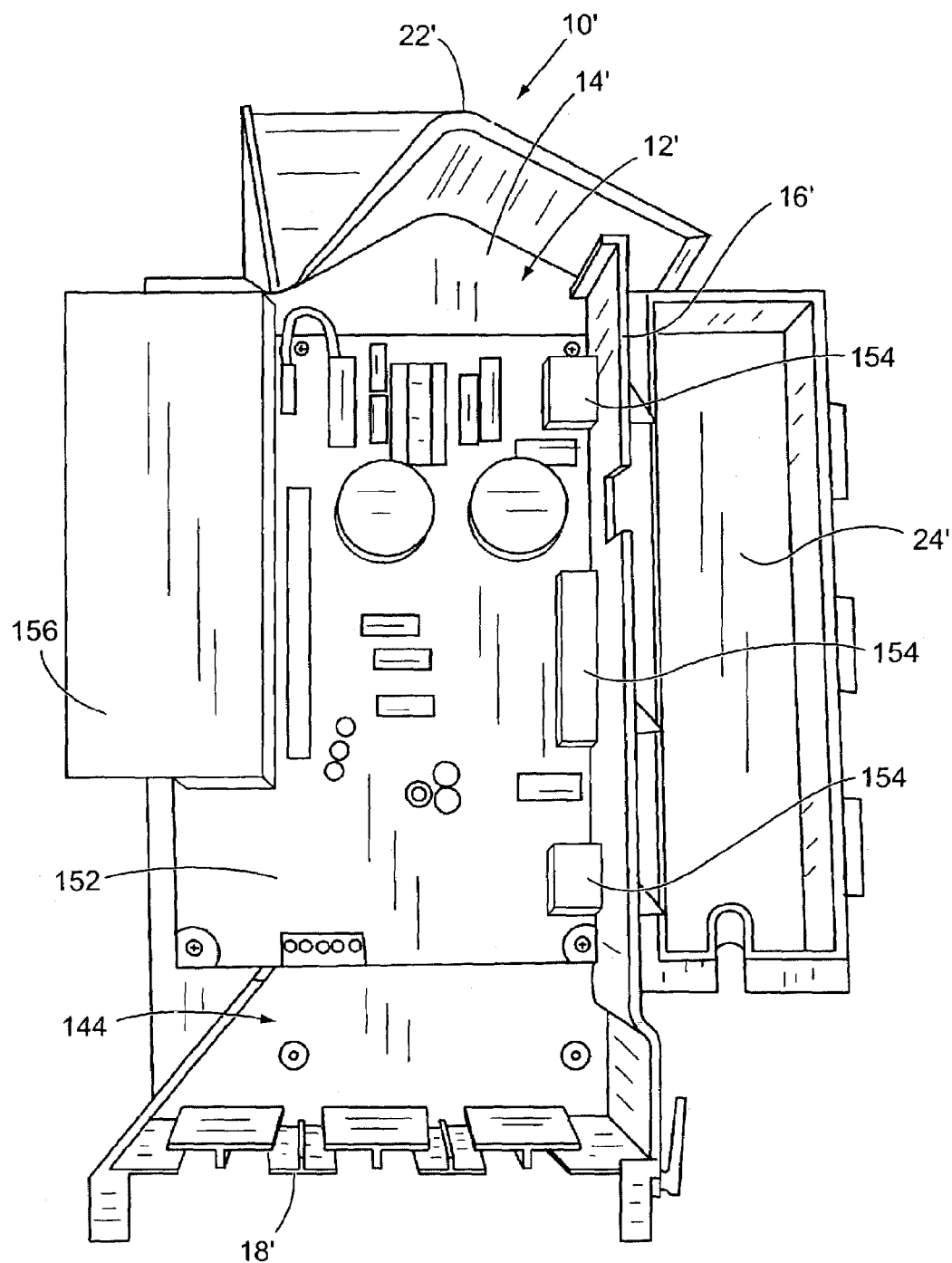
FIG. 10 is a front elevational view of a further embodiment of the housing with a circuit board installed.
Figure 11:
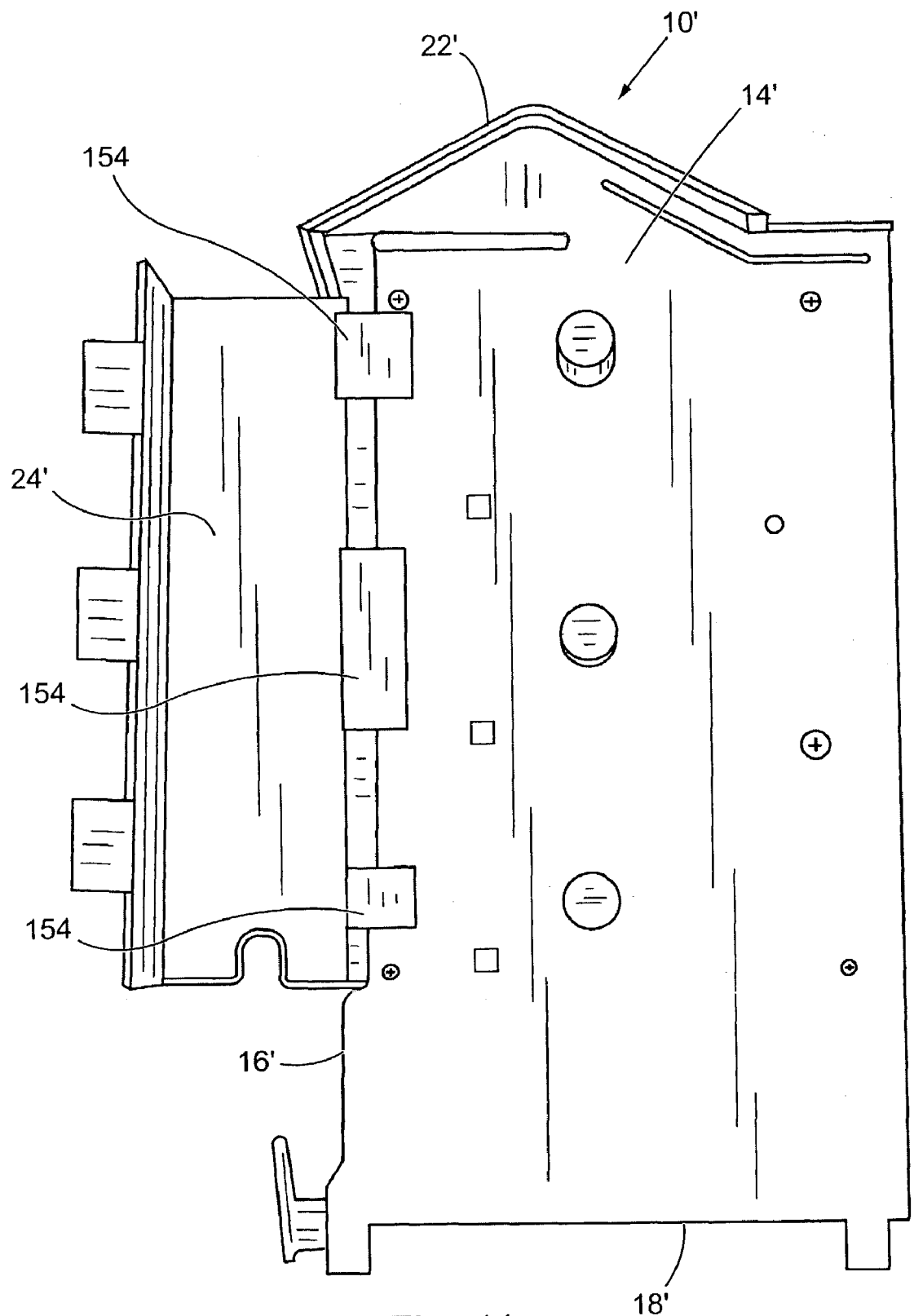
FIG. 11 is a rear elevational view of the housing of FIG. 10 with the circuit board installed.
Figure 12:
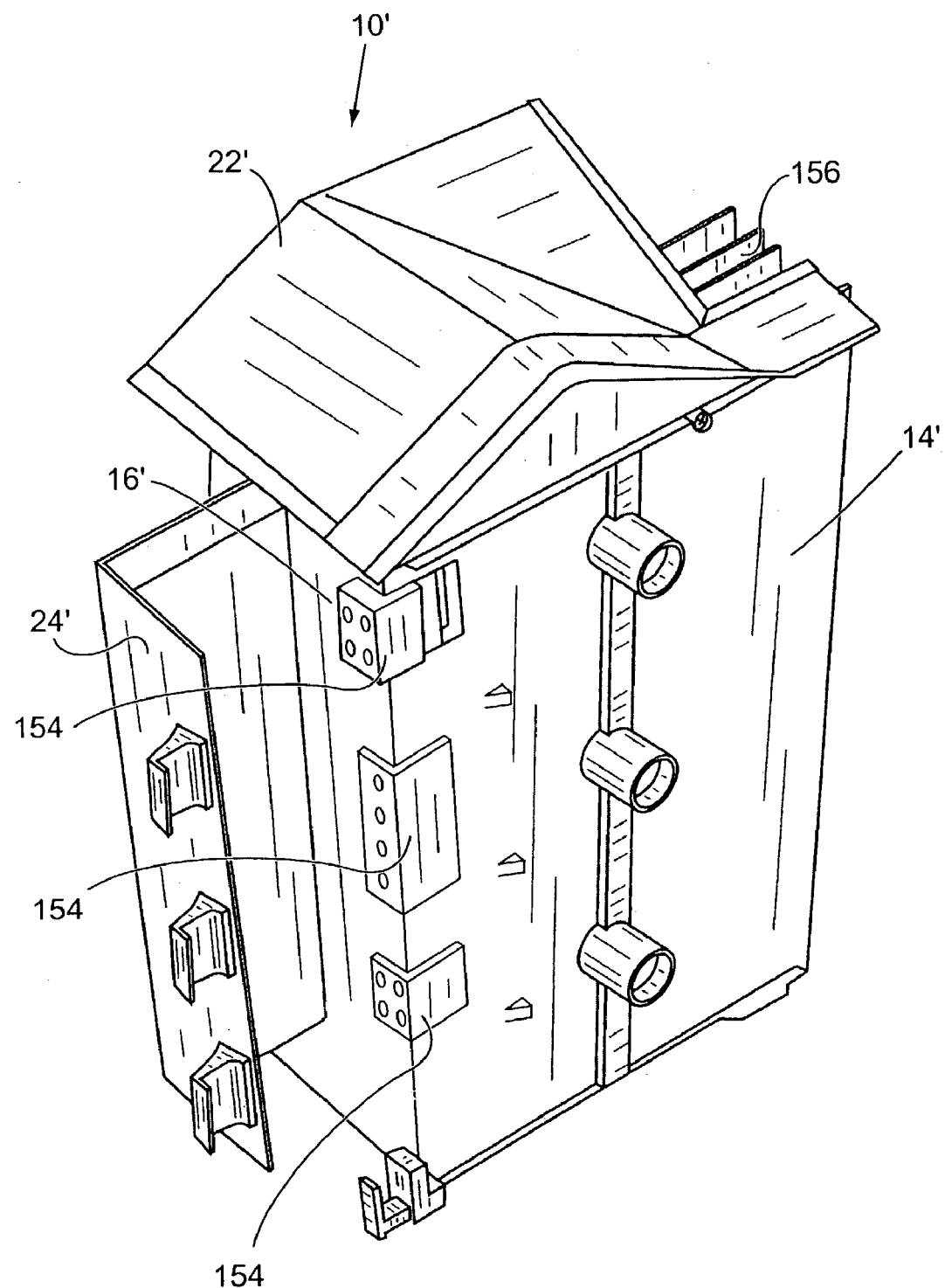
FIG. 12 is a rear perspective view of the housing of FIGS. 10 and 11.

FIGS. 10, 11 and 12 show a variant embodiment of the circuitry housing of the invention. The housing shown in FIGS. 10, 11 and 12 is basically the same as that described above, however an additional interior compartment 144 is provided at the bottom of the housing. The additional interior compartment 144 is provided for use of the housing with control circuitry that also comprises a mother board. Apart from the additional compartment 144, the construction of the circuitry housing shown in FIGS. 10, 11 and 12 is substantially identical to that of the housing 10 described above and component parts of the alternative housing are identified by the same reference numbers followed by a prime ('). The embodiment of the housing 10' shown in FIGS. 10, 11 and 12 is relied on below and in drawing FIGS. 10, 11 and 12 in describing how a circuit board is attached to the housing interior.

In attaching the circuit board 152 to the back wall interior surface 32' in the position shown in FIG. 10, the right side edge of the circuit board as viewed in FIG. 10 is positioned beneath the clasps or flanges 68' projecting outwardly from the right side wall interior surface 62'. The electric terminals 154 of the circuit board are aligned with the rectangular openings 38' in the back wall and the corresponding rectangular openings 64' in the right side wall. The left-hand edge of the circuit board 152 is then pressed against the back wall interior surface 32' and against the resilient tabs 42' on the left side of the back wall. This causes the resilient tabs to deflect away from the right side wall 16' until the tab hooks 46' snap over the left-hand edge of the circuit board 152. This holds the circuit board 152 against the fastener posts 36' projecting outwardly from the back wall interior surface. The engagement of the posts 36' against the rear of the circuit board 152 and the engagement of the clasps or flanges 68' over the right-side edge of the circuit board and the resilient tabs 42' over the left-side edge of the circuit board is sufficient to hold the circuit board to the back wall interior surface 32' without the use of separate fasteners. However, screw threaded fasteners could be inserted through the fastener holes 52' in the back wall exterior surface threading the fasteners into corresponding connectors in the circuit board 152 to further secure the circuit board in the housing. With the fasteners removed from the circuit board, the circuit board can be easily released from the back wall interior surface 32' by passing the edge of a flathead screwdriver through the rectangular openings 56' in the back wall exterior surface and pushing the resilient tabs 42' away from the circuit board edge with the screwdriver head, thus releasing the circuit board.

As is also shown in FIG. 10, the absence of a left side wall on the housing enables the use of a larger heat sink 156 on the circuit board. The heat sink 156 extends from the circuit board 152 away from the housing right side wall 16' and through the opening in the housing provided by the absence of a left side wall. The heat sink 156 projects outside of the housing 10' where it is more accessible to cooling ventilation.

With the circuit board attached to the back wall, the electrical terminals 154 of the circuit board are accessible from the exterior of the housing. To attach separate appliance wiring plugs to the electric terminals 154, the plugs are first inserted into the terminals that are accessible from the exterior of the housing through the rectangular openings 38' in the housing back wall and the rectangular openings 64' in the housing right side wall. To securely attach the appliance wiring plugs to the electric terminals 154, an installer can engage their index finger of one hand over each of the posts 54' projecting from the back wall adjacent to the plug being installed and push the plug onto the electric terminal with the thumb of the same hand. Thus, providing the projecting posts 54' on the back wall exterior surface facilitates the attachment of the separate appliance wiring plugs to the electric terminals 154 of the circuit board.

With the appliance wiring plugs attached to the electric terminals, the door 24' can be closed over the plugs. The door is moved to its closed position with the door first section 86' covering over the right side wall exterior surface 72' and the plugs protruding from the electric terminals, and with the door second section 88' covering over the back wall exterior surface 34'. The rectangular openings 98' of the door align with the triangular projections 58' on the back wall exterior surface and the engagement of the projections 58' in the rectangular openings 98' holds the door in its closed position. To move the door to its opened position, a person need only pull from one of the levers 94' on the door exterior surface to disengage the back wall projections 58' from the door rectangular openings 98' and open the door.

Figure 13A:
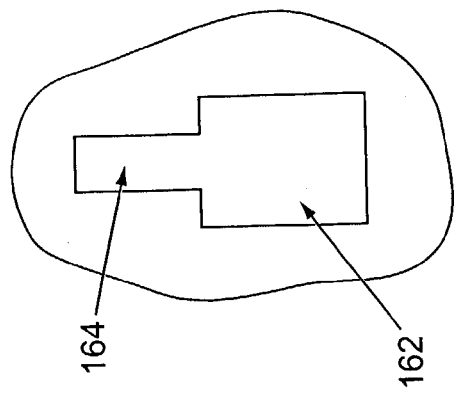
FIG. 13*a* is a partial plan view of a connection opening in FIG. 13.

To attach the housing 10 of FIG. 1 to the appliance, a lower panel of the appliance is provided with four key shaped openings that each have a large rectangular area section 162 dimensioned to receive one of the bottom wall legs 126 of the housing, and an adjacent smaller, narrow area section 164 that receives the reduced width portion of the leg 126 formed by the opposed leg slots 132. The detail of each opening is shown in FIG. 13a. In installing the housing, each of the legs 126 is first positioned in the larger appliance opening section 162 with the leg slots 132 positioned in the same horizontal plane as the edges of the appliance opening. The housing is then moved sideways so that the leg slots 132 each receive an edge of the appliance opening on the opposite sides of the smaller area section 164 of the appliance opening. Because the hook 138 of the resilient latch 136 is positioned in the same plane as the leg slots 132, when the legs are positioned in the appliance openings so that the leg slots 132 are aligned with the edges of the appliance openings, the appliance panel displaces the resilient latch 136. As the housing moves sideways through the narrower and smaller sections 164 of the appliance openings, the resilient latch hook 138 eventually comes into alignment with the larger section 162 of the appliance opening and the resilience of the latch causes the latch to move to its at-rest position where the hook 138 is positioned in the larger opening section 162 in the same plane as the leg slots 132. The resilient latch hook 138 extending into the appliance opening larger section 162 prevents the housing legs 126 from sliding back through the narrow opening sections 164 and holds the housing in place secured to the appliance. To remove the housing from the appliance openings, it is only necessary that the latch finger tab 142 be pressed, removing the latch hook 138 from the appliance opening. This will allow the housing legs 126 to be moved sideways through the housing openings until they are again aligned with the larger sections 162 of the openings from which they can be withdrawn from the appliance openings.

Figure 13:
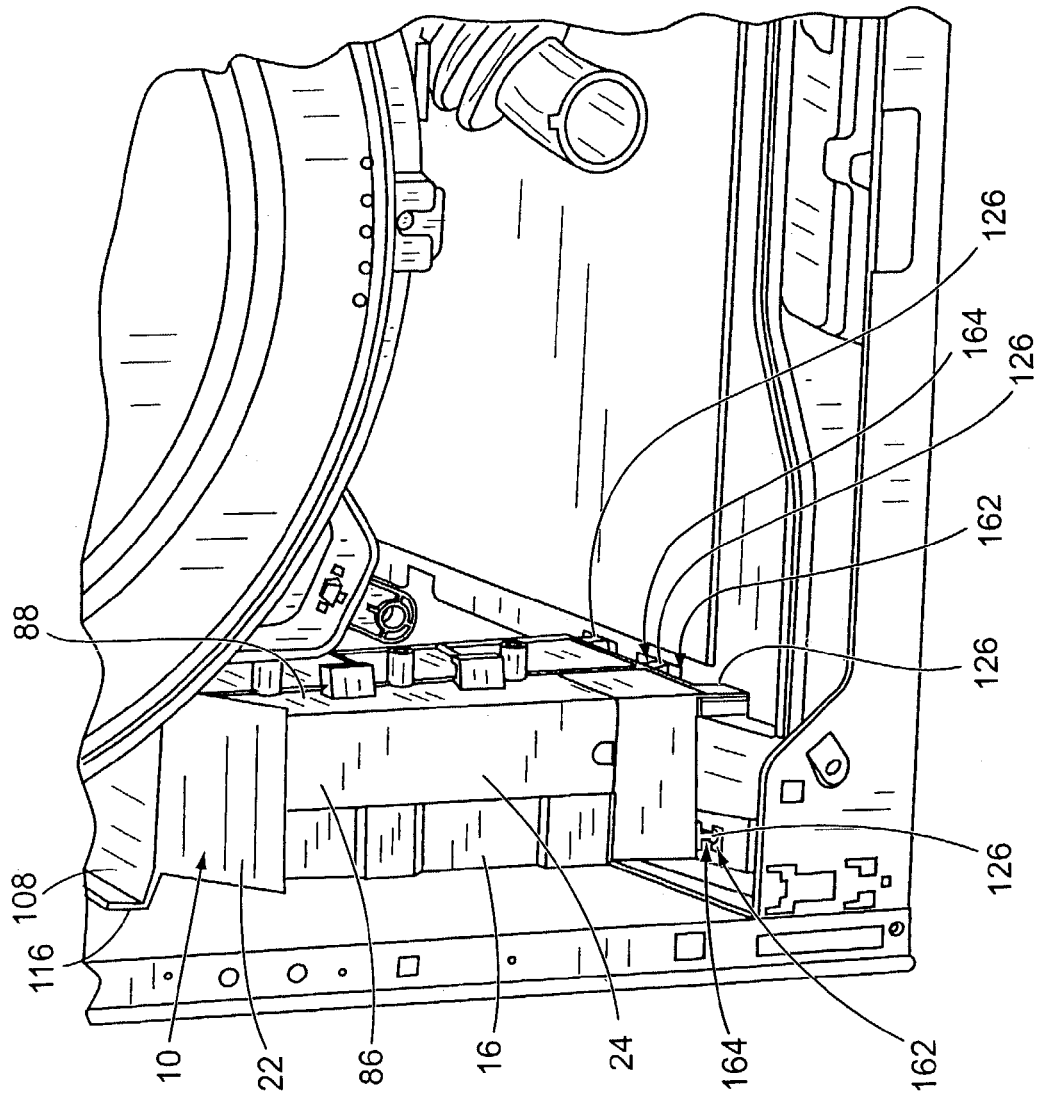
FIG. 13 is an illustrative environment of a home appliance with the control circuit housing of the invention installed in the appliance.
Figure 14:
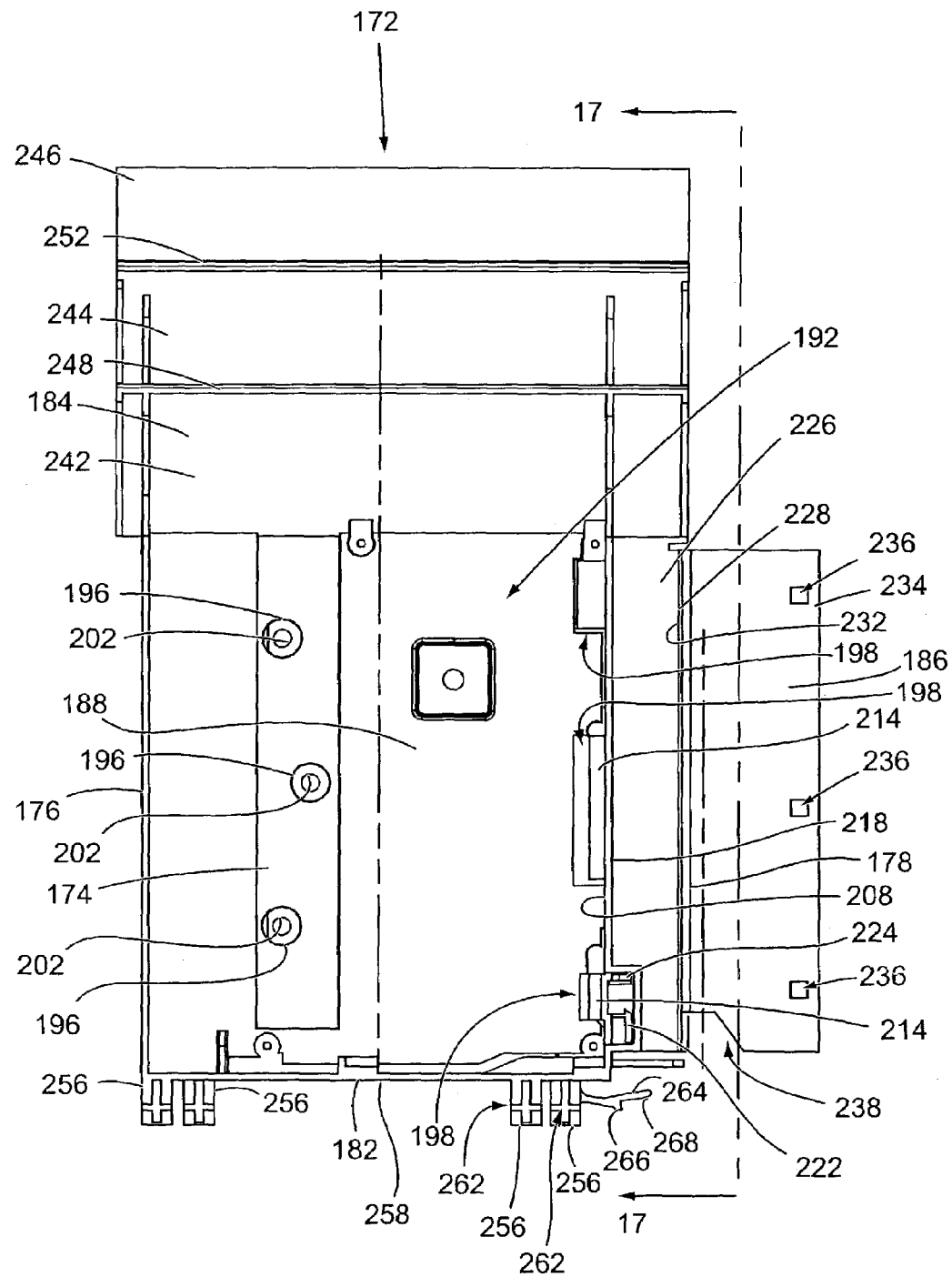
FIG. 14 is a front elevation view of a further embodiment of the appliance control circuitry housing of the invention.

To further secure the housing to the appliance interior, an adhesive pad can be applied to the top wall flap 114. The pad, with the housing in place in the appliance openings 162, 164, is then pressed against the side wall of the appliance to securely hold the housing in the appliance as shown in FIG. 13.

FIGS. 14–22 show the presently preferred embodiment of the appliance control circuitry housing 172 of the invention. This embodiment of the housing 172 has a more simplified constriction from the previously described embodiments. However, it also employs many of the desirable features of the first described embodiment. The housing 172 is basically comprised of a back wall 174, a left side wall 176, a right side wall 178, a bottom wall 182, an opposite top wall 184, and a door 186 on an exterior surface of the right side wall 178. The back wall, side walls, bottom wall, top wall, and door are all integrally molded as a single unit. The back wall 174, left side wall 176, right side wall 178, bottom wall 182 and top wall 184 surround an interior volume 192 of the housing that is accessible through the front of the housing.

The housing back wall 174 has an interior surface 188 that opposes the housing interior volume 192 and an opposite exterior surface 194. The back wall interior surface 188 is basically flat except for the presence of three posts 196 that support the circuit board and receive threaded fasteners. Three generally rectangular openings 198 pass through the back wall 174 adjacent to its connection to the right side wall 178. These three openings 198 accommodate the electric terminals of the circuit board that is mounted to the back wall interior surface 188.

FIG. 18 shows the back wall exterior surface 194. The exterior surface 194 has three fastener openings or holes 202 that pass through the back wall 174 and through the posts 196 on the back wall interior surface. In addition, a hollow rectangular column or post 204 projects outwardly from the back wall exterior surface 194. The interior of the column 204 in the housing interior accommodates circuitry components on the circuit board attached to the housing. Three projections 206 project outwardly from the back wall exterior surface 194 adjacent to the three openings 198 through the back wall. The projections 206 are generally rectangular in cross section and are employed and holding the door 186 in its closed position just as the projections of the first described embodiment.

The left side wall 176 projects outwardly from the back wall interior surface 188 at a right angle to the surface. The left side wall 176 extends entirely along the left edge of the back wall 174 between the housing bottom wall 182 and the housing top wall 184.

Figures 15, 16:
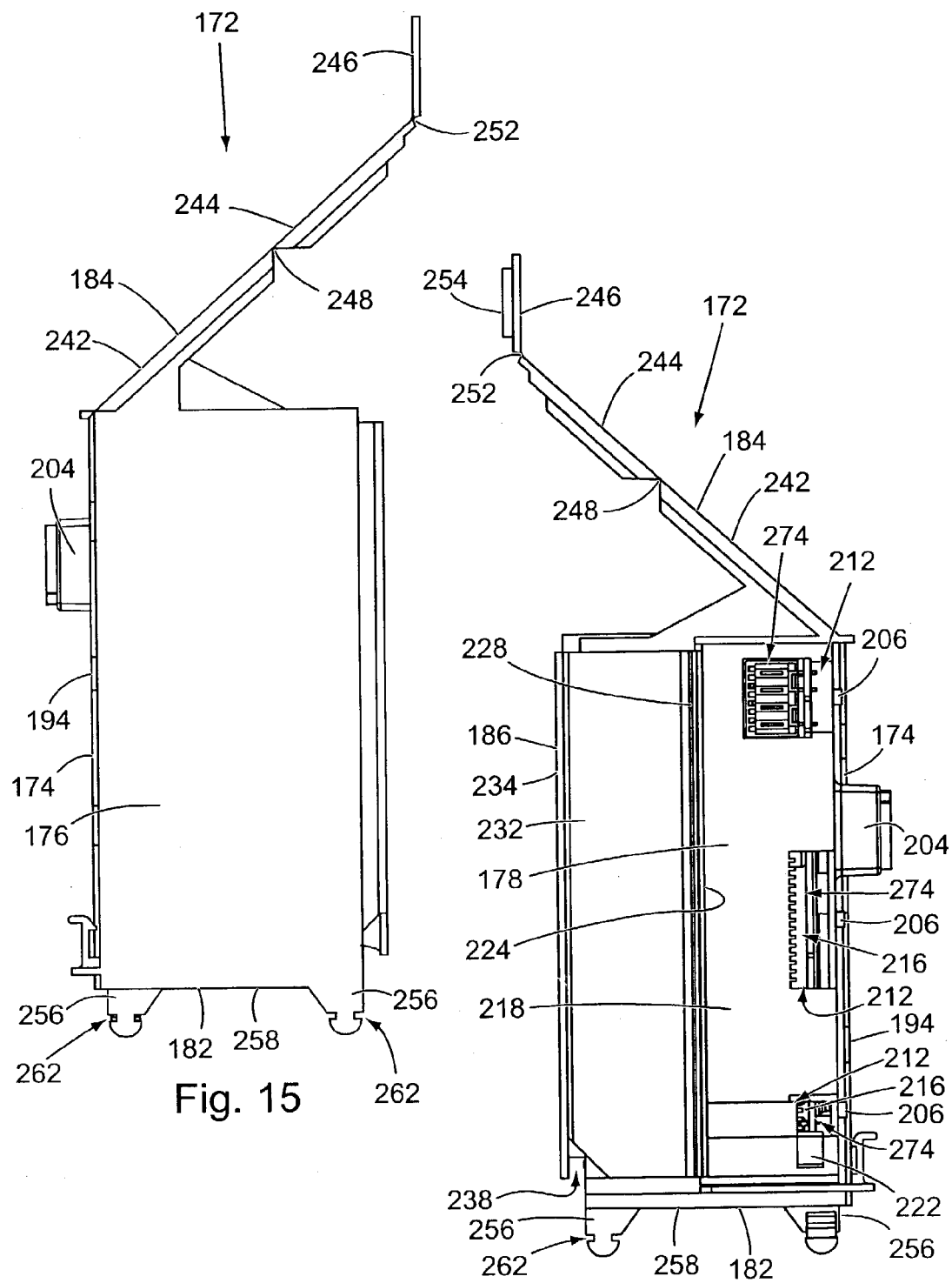
FIG. 15 is a left side elevation view of the housing of FIG. 14.
FIG. 16 is a right side elevation view of the housing of FIG. 14.

The right side wall 178 projects outwardly from the back wall interior surface 188 at a right angle to the surface. The right side wall has an interior surface 208 that faces toward the housing interior volume 192. The right side wall has three generally rectangular openings 212 that correspond to and are extensions of the three openings 198 in the back wall. A pair of flanges 214 project outwardly from the right side wall interior surface 208 adjacent to two of the openings 212 in the right side wall. In FIG. 21, the flanges 214 are shown positioned adjacent the bottom two openings 212 in the right side wall. The flanges 214 are provided with a series of serrations 216 that face toward the openings 212 as shown in FIG. 16. These serrations 216 function as serrations that had been formed on the separate frame of the prior art that was employed in holding the circuit board to the prior art circuitry housing. In this embodiment of the housing, the serrations 216 on the flanges 214 are made an integral part of the housing interior. The serrations function to align separate appliance wiring plugs that are attached to circuit board connecters that are positioned in the openings 212 of the right side wall 178 when the circuit board is attached to the housing. A resilient latch 222 and an opposite positioning panel 224 are provided on the exterior surface of the right side wall 178. The latch 222 and panel 224 are the same as the previously described latch 74 and panel 76 of the first described embodiment.

The door 186 is also mounted on the right side wall exterior surface 218. The door 186 is attached to the right side wall 178 by a door panel 226 that projects outwardly from the right side wall exterior surface 218 at a right angle. The door panel 226 extends along the entire length of the right side wall 178. The door 186 is connected to the door panel 226 by a living hinge 228 formed between the door and the panel. The door 186 has an L-shape with a first section 232 that overlaps the right side wall 178 when the door is closed and a second section 234 that overlaps the back wall 174 when the door is closed. The door panel 226 positions the door first section 232 outwardly from the right side wall exterior surface 218 when the door is closed to provide room for the appliance wiring plugs connected to the connectors of the circuit board in the housing. The door has three small square openings 236 through the door second section 234 that are positioned to receive the three projections 206 on the back wall exterior surface when the door is moved to the closed position. The projections 206 engage in the openings 236 to hold the door in the closed position just as in the first described embodiment. An opening 238 is provided at the bottom of the intersection of the door first and second sections 232, 234 to accommodate the wiring of the appliance wiring plugs.

The housing top wall 184 is comprised of three panels 242, 244, 246. The first of the three panels 242 is held at an angular orientation over the housing interior volume 192 by the top of the left side wall 176 and the top of the right side wall 178. The top wall second panel 244 is connected to the top wall first panel 242 by a living hinge 248 that extends across the two panels and allows the two panels to pivot relative to each other. The third top wall panel 246 is connected to the second top wall panel 244 by a living hinge 252 that extends across the two panels and allows the third panel 246 to pivot relative to the second panel 244. An adhesive pad 254 is applied to one side of the third top wall panel 246. The adhesive pad is pressed against a side wall of the appliance in attaching the housing to the appliance.

The housing bottom wall 182 projects outwardly from the bottom of the back wall interior surface 188 and extends between the bottoms of the left side wall 176 and the right side wall 178. Four housing legs 256 project downwardly from the bottom wall exterior surface 258. Each of the legs 256 is formed in the same manner as the legs 126 of the first described embodiment, i.e. with a pair of slots 262 formed in opposite side surfaces of the legs. A resilient latch 264 also projects outwardly from the bottom wall exterior surface 258. The latch 264 is formed in the same manner as the latch 136 of the first described embodiment, i.e. with a hook 266 at one end and a finger tab 268 at the opposite end.

FIGS. 16, 21, and 22 show a circuit board 272 attached in the interior of the housing 172. In attaching the circuit board 272 to the housing back wall interior surface 188 in the position shown in FIG. 21, the circuit board 272 is positioned against the posts 196 with the right side edge of the circuit board as viewed in FIG. 21 positioned beneath the flanges 214 projecting outwardly from the right side wall interior surface 208. The electric terminals 274 of the circuit board are aligned with the back wall openings 198 and the corresponding right side wall openings 212. This aligns fastener holes (not shown) through the circuit board 272 and into the heat sink 276 on the left side of the circuit board as viewed in FIG. 21 with the fastener holes 202 through the back wall of the housing. Screw threaded fasteners are inserted through the fastener holes 202 and are screwed into holes in the back of the heat sink 276 to securely hold the circuit board 272 to the housing back wall interior surface 188.

With the circuit board attached to the housing back wall 174, the circuit board electric terminals 274 are accessible from the exterior of the housing through the right side wall openings 212. This enables separate appliance wiring plugs exterior to the housing 172 to be attached to the electric terminals 274 of the circuit board 272 inside the housing.

With the appliance wiring plugs attached to the electric terminals 274, the door 186 can be closed over the plugs. The door is moved to its closed position with the door first section 232 covering over the right side wall exterior surface 218 and the wiring plugs protruding from the electric terminals 274, and with the door second section 234 covering over a portion of the back wall exterior surface 194.

The rectangular openings of the door 236 align with the triangular projections 206 on the back wall exterior surface and the engagement of the projections in the door openings holds the door in its closed position.

The attachment of the circuitry housing 172 to an appliance is accomplished in substantially the same manner as the first described embodiment. The housing legs 256 are first positioned in the larger appliance opening sections 162 shown in FIG. 13a with the leg slots 262 positioned in the same horizontal plane as the edges of the appliance openings. The housing is then moved sideways so that the leg slots 262 each receive an edge of the appliance opening on the opposite sides of the smaller area section 164 of the appliance opening. As the housing moves sideways through the smaller sections 164 of the appliance openings, the resilient latch 264 eventually comes into alignment with one of the larger opening sections 162 and moves to its at-rest position where the latch hook 266 is positioned in the larger opening section 162 in the same plane as the leg slots 262. As in the first described embodiment, the latch hook 266 extending into the appliance opening larger section 164 prevents the housing legs 256 from sliding back through the narrow opening sections 164 and holds the housing in place secured to the appliance. To remove the housing from the appliance, it is only necessary that the latch finger tab 268 be pressed, removing the latch hook 266 from the appliance opening. This allows the housing legs 256 to be moved sideways through the housing openings until they are aligned with the larger sections 162 of the openings from which they can be withdrawn.

To further secure the housing to the appliance interior, the adhesive pad 254 on the third top wall panel 246 is pressed against the side wall of the appliance to securely hold the housing in the appliance.

Although the appliance circuitry housing of the invention has been described above by reference to specific embodiments, it should be understood that other variations and modifications could be made to the housing without departing from the scope of the invention provided by the following claims.

What is claimed is:

1. An appliance control circuitry housing comprising:
a wall having an exterior surface and an opposite interior surface, the interior surface facing toward an interior volume of the housing;
a circuit board holding mechanism that projects from the wall interior surface into the housing interior volume;
a circuit board in engagement with the circuit board holding mechanism and held to the wall interior surface by the circuit board holding mechanism;
at least one electric terminal opening extending through the wall;
an electric terminal on the circuit board that is positioned in the electric terminal opening where the electric terminal is accessible from the wall exterior surface;
the wall being a back wall of the terminal housing;
a side wall connected to the back wall and projecting outwardly from the back wall interior surface at an angle relative to the back wall;
the electric terminal opening also extending through the side wall.

2. The housing of claim 1, further comprising:
a door connected to the housing by a hinge that enables the door to move between a closed position and an opened position of the door relative to the housing where in the closed position the door covers over the electric terminal opening and the electric terminal so that the electric terminal is not accessible from the wall exterior surface and in the opened position the door is displaced from both the electric terminal opening and the electric terminal and the electric terminal is accessible from the wall exterior surface.

3. The housing of claim 1, further comprising:
a door connected to the side wall by a hinge that enables the door to move between a closed position and an opened position of the door relative to the side wall where in the closed position the door covers over the electric terminal opening and the electric terminal so that the electric terminal is not accessible through the side wall and in the opened position the door is displaced from both the electric terminal opening and the electric terminal and the electric terminal is accessible through the side wall.

4. An appliance control circuitry housing comprising:
a wall having an exterior surface and an opposite interior surface, the interior surface facing toward an interior volume of the housing; the wall having an electric terminal opening extending through the wall;
a circuit board mounted to the wall interior surface inside the housing interior volume;
an electric terminal on the circuit board that is positioned in the wall electric terminal opening where the electric terminal is accessible from the wall exterior surface;
the electric terminal opening in the wall being one of a plurality of electric terminal openings extending through the wall;
the electric terminal on the circuit board being one of a plurality of electric terminals on the circuit board with each electric terminal being positioned in a wall electric terminal opening where each electric terminal is accessible from the wall exterior surface.

5. The housing of claim 4, further comprising:
a door connected to the housing by a hinge that enables the door to move between a closed position and an opened position of the door relative to the housing where in the closed position the door overlaps the wall exterior surface and covers over the electric terminal opening and the electric terminal so that the electric terminal is not accessible from the wall exterior surface and in the opened position the door is displaced from both the electric terminal opening and the electric terminal and the electric terminal is accessible from the wall exterior surface.

6. The housing of claim 5, further comprising:
the door having an interior surface and an opposite exterior surface, the door interior surface overlaps and opposes the wall exterior surface when the door is in the closed position.

7. The housing of claim 6, further comprising:
a projection projecting outwardly from the wall exterior surface at a position where the projection engages against an edge of the door when the door is in the closed position and holds the door in the closed position.

8. An appliance and control circuitry housing comprising:
the housing having an exterior surface and an opposite interior surface, the housing having an interior volume with the housing interior surface facing toward the housing interior volume;
a slot on the housing exterior surface;
a resilient latch on the housing exterior surface, a resiliency of the latch enabling the latch to be movable between a first, at-rest position of the latch relative to the housing and a second, biased position of the latch relative to the housing where the resiliency of the latch biases the latch back toward the first, at-rest position from the second, biased position; and first and second edges on the appliance, the first and second edges being positioned on the appliance where the first edge engages in the slot and the second edge engages against the latch in the first position of the latch and holds the housing to the appliance.

9. The appliance and housing of claim 8, further comprising:

the resiliency of the latch biasing the latch against the second edge and holding the slot on the first edge.

10. The appliance and motor control housing of claim 8, further comprising:

the first edge bordering part of an opening in the appliance and the second edge bordering part of an opening in the appliance.

11. An appliance and control circuitry housing comprising:

the housing having an exterior surface and an opposite interior surface, the housing having an interior volume with the housing interior surface facing toward the housing interior volume;

a slot on the housing exterior surface;

a resilient latch on the housing exterior surface, the latch being movable between a first, at-rest position and a second, biased position where resiliency of the latch biases the latch back toward the first, at-rest position;

first and second edges on the appliance, the first edge engaging in the slot and the second edge engaging against the latch and holding the housing to the appliance;

a plurality of legs projecting from the housing exterior surface;

the slot being one of a plurality of slots in the plurality of legs;

a plurality of openings in the appliance;

the first edge being one of a plurality of first edges that border a part of each of the plurality of openings; and the plurality of legs being inserted into the plurality of openings with the slot in each leg receiving the first edge of the opening the leg is inserted into.

12. An appliance and control circuitry housing comprising:

the housing having an exterior surface and an opposite interior surface, the housing having an interior volume with the housing interior surface facing toward the housing interior volume;

a slot on the housing exterior surface;

a resilient latch on the housing exterior surface, the latch being movable between a first, at-rest position and a second, biased position where resiliency of the latch biases the latch back toward the first, at-rest position;

first and second edges on the appliance, the first edge engaging in the slot and the second edge engaging against the latch and holding the housing to the appliance; and, a leg projecting from the housing exterior surface and the slot being in the leg.

13. The appliance and motor control housing of claim 12, further comprising:

a first opening in the appliance and the first edge bordering a part of the first opening; and the leg projecting from the housing into the first opening with the first edge extending into the slot in the leg.

14. The appliance and motor control housing of claim 13, further comprising:

a second opening in the appliance that is separate from the first opening and the second edge bordering a part of the second opening; and the latch projecting from the housing into the second opening.

15. The appliance and motor control housing of claim 13, further comprising:

the first opening being a hole in the appliance, the hole having first and second sections with the first section having an area that is smaller than the second section;

the first edge being part of an edge that borders the hole with the first edge bordering part of the first section of the hole;

the leg being inserted into the second section of the hole and being moved into the first section of the hole where the first edge engages in the slot in the leg.

16. The appliance and motor control housing of claim 14, further comprising:

the first opening having a smaller area than an area of the second opening.

17. The appliance and motor control housing of claim 14, further comprising:

the first and second openings being connected to each other.

* * * * *